United States Patent [19]

Hong

[11] Patent Number: 5,233,435
[45] Date of Patent: Aug. 3, 1993

[54] TAPE RECORDING SYSTEM FOR VIDEO CASSETTE TAPE RECORDER

[75] Inventor: Sung H. Hong, Seoul, Rep. of Korea

[73] Assignee: Goldstar Co., Ltd., Seoul, Rep. of Korea

[21] Appl. No.: 859,042

[22] Filed: Mar. 27, 1992

[30] Foreign Application Priority Data

Mar. 27, 1991 [KR] Rep. of Korea ............. 4810/1991

[51] Int. Cl.$^5$ .............................................. H04N 9/79
[52] U.S. Cl. ........................................ 358/315; 358/310
[58] Field of Search ............. 358/335, 327, 330, 310, 358/315, 316, 311; 360/15, 33.1

[56] References Cited

U.S. PATENT DOCUMENTS

| | | | |
|---|---|---|---|
| 4,791,495 | 12/1988 | Umemoto et al. | 358/310 |
| 4,827,357 | 5/1989 | Kawakami | 358/310 |
| 5,057,934 | 10/1991 | Yun et al. | 358/335 |

Primary Examiner—Tommy Chin
Assistant Examiner—Robert Chevalier
Attorney, Agent, or Firm—Ostrolenk, Faber, Gerb & Soffen

[57] ABSTRACT

A tape recording system for use in a video cassette tape recorder capable of recording a reproducing signal of a video tape to another video tape by directly interfacing the reproducing high frequency signal without reproducing signal processing and recording signal processing, which includes a reproducing signal switching unit for buffering and outputting a high-frequency reproducing signal without a demodulation processing, a recording signal switching unit for controlling the level of a video signal into a proper recording current corresponding to the characteristic of video head without a modulation processing so as to directly switch the video signal to a recording section, and a level displaying unit for comparing the recording signal of the recording signal switching unit and a reference frequency.

5 Claims, 1 Drawing Sheet

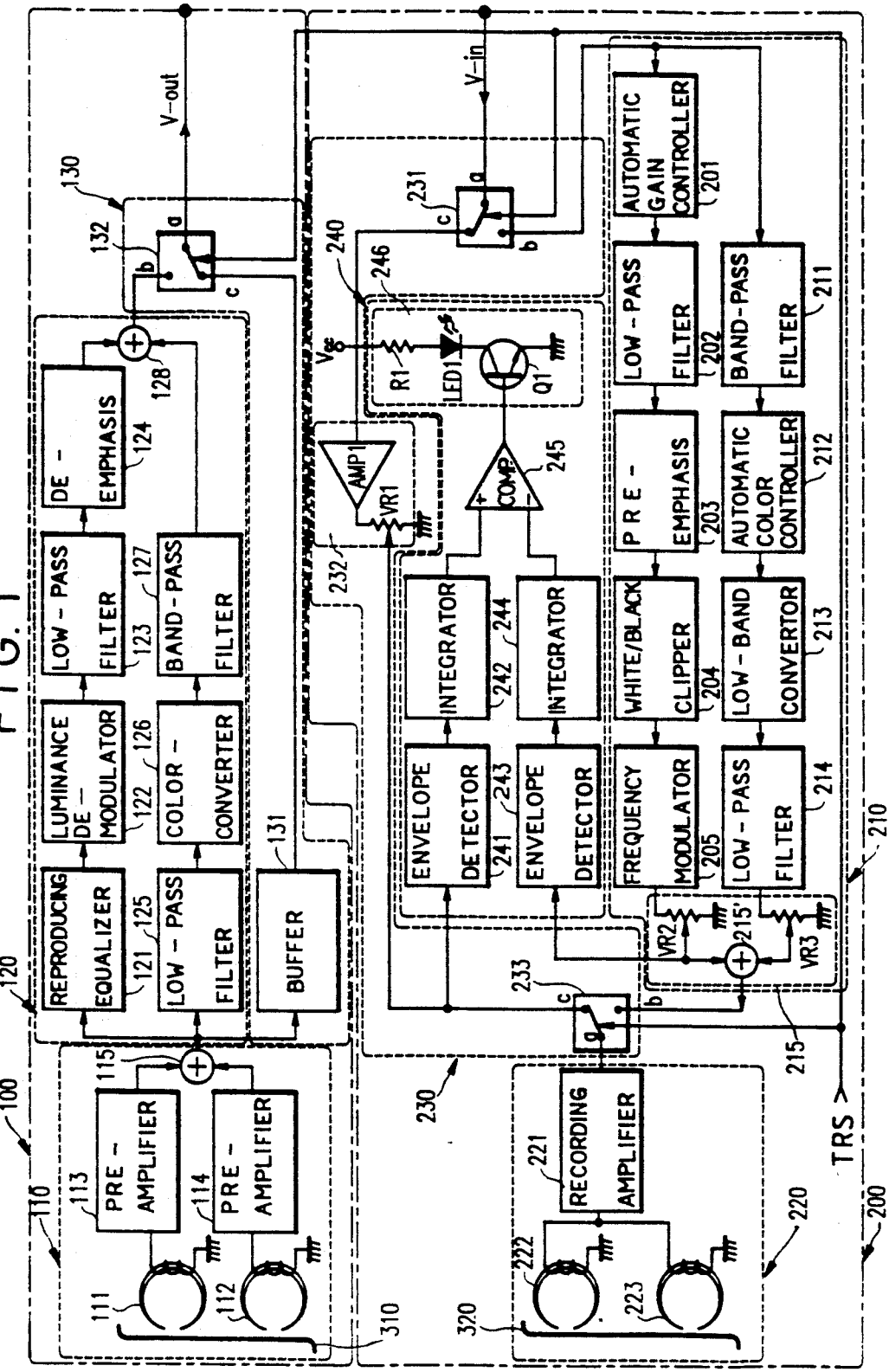

TAPE RECORDING SYSTEM FOR VIDEO CASSETTE TAPE RECORDER

BACKGROUND OF THE INVENTION

1. Field of the Invention

The present invention relates in general to a video cassette tape recorder (hereinafter, referred to as a VCR), and more particularly to a tape recording system for use in a VCR in which a high-frequency reproduction signal is directly interfaced and recorded on a video tape without performing a reproduction signal processing and a recording signal processing when a reproduction signal of a video tape is recorded on another video tape, so that a noise is reduced and a picture of good quality is obtained.

2. Description of the Prior Art

In general, when it is desired to record a reproducing signal of a video tape to another video tape, there is required two video cassette tape recorders which are connected to each other by a high-frequency cable, one for reproducing a video tape and the other for recording the reproduced signal to another tape.

In the first video cassette tape recorder (hereinafter, referred to as a reproducing VCR), the reproducing signal which is detected at a reproducing head is demodulated into a luminance signal and a color signal and then filtered in multiple stages. Thereafter, the luminance signal and the color signal are composited to each other and then outputted as a reproducing video signal.

Thereafter, the reproducing video signal which is outputted from the reproducing VCR is inputted to the other video cassette tape recorder (hereinafter, referred to as a recording VCR) through the high-frequency cable and recorded on a video tape after being subject to signal processing for recording. In this case, the signal processing for recording is carried out in a manner that the inputted reproducing video signals are subject to a number of filterings and modulations by a luminance signal and a color signal and then composed to each other, thereafter recorded on another video tape through recording heads.

As described above, since both the reproducing signal processing and the recording signal processing are required in case that a reproducing signal of a video tape is to be recorded in another tape, there are disadvantages in that waveforms of the video signal are distorted to cause a noise and the signal/noise ratio is decreased so that the picture quality is deteriorated in the various filterings demodulations and the signal processings such as frequency convertions.

SUMMARY OF THE INVENTION

Accordingly, it is an object of the present invention to provide a tape recording system for a video cassette tape recorder, which is capable of preventing the recorded video signals from being distorted and obtaining a picture of high resolution by increasing the signal/-noise ratio.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a tape recording system for use in a video cassette tape recorder including a reproducing section for detecting a video signal from a video tape by means of reproducing heads, a reproducing signal processing section for processing the reproducing signal outputted from the reproducing section by a luminance signal and a color signal, a reproducing signal switching section for selecting either an output signal from the reproducing signal processing section or an output signal from the reproducing section upon the selection of a user and outputting the selected signal to a video signal output terminal as a reproducing video signal, a recording signal processing section for signal-processing the video signal being inputted through a video signal input terminal by a luminance signal and a color signal, a recording section for recording a recording signal on a video tape through recording heads, a recording signal switching section for either introducing the video signal being inputted to the video signal input terminal to be outputted as a recording signal through the recording signal processing section upon the selection of a user or switching the inputted video signal so that the level of the video signal is a proper recording current corresponding to the characteristic of the recording heads, thereby being outputted as a recording signal, and a level displaying section for comparing the level of the recording signal which passes through the recording signal switching section and the level of a reference frequency of the recording signal processing section and displaying the comparing resultant.

BRIEF DESCRIPTION OF THE DRAWINGS

The present invention will become more fully understood from the detailed description given hereinbelow and the accompanying single drawing which are given by way of illustration only, and thus are not limitative of the present invention, and wherein:

FIG. 1 is a block diagram of the tape recording system for a video cassette tape recorder according to the present invention.

DESCRIPTION OF THE PREFERRED EMBODIMENTS

Referring now in detail to the drawing for the purpose of illustrating preferred embodiments of the present invention, the tape recording system comprises a reproducing section 110 for detecting a video signal from a video tape 310 by means of video heads 111 and 112, a reproducing signal processing section 120 for processing the reproducing signal, which is outputted from the reproducing section 110, by a luminance signal and a color signal, a reproducing signal switching section 130 for selecting either an output signal from the reproducing signal processing section 120, or an output signal from the reproducing section 110 upon the selection of a user and outputting the selected signal to a video signal output terminal V-OUT as a reproducing video signal, a recording signal processing section 210 for processing the video signal which is inputted to a video signal input terminal V-IN by a luminance signal and a color signal, a recording signal switching section 230 for either switching the video signal which is inputted to the video signal input terminal V-IN so that the signal is outputted as a recording signal through the recording signal processing section 210, or switching the video signal inputted to the video signal input terminal V-IN so that the signal is outputted as a recording signal after its level is controlled into a recording current suitable for the recording head characteristic, a recording section 220 for recording a recording signal on a video tape 320 through recording heads 222 and 223, and a level displaying section 240 for comparing the level of the recording signal which has passed through the recording signal switching section 230 and the level of a reference frequency of the recording signal processing section 210 and displaying the comparing resultant.

The reproducing signal switching section 130 includes a buffer 131 for buffering the reproducing signal which is outputted from an adder 115 of the reproducing section 110, and a reproducing signal selection switch 132 for selecting either an output signal from the buffer 131, or an output signal from an adder 128 of the reproducing signal processing section 120 and outputting the selected signal to the video signal output terminal V-OUT.

The recording signal switching section 230 includes a level controller 232 for amplifying the inputted video signal through an amplifier $AMP_1$ and controlling the level of the video signal through a variable resistor $VR_1$ so as to be a proper recording current which meets the characteristics of the recording heads, an input path selection switch 231 for switching the video signal inputted through the video signal input terminal V-IN to the recording signal processing section 210 or to the level controller 232, and a recording signal selection switch 233 for selecting an output signal from the level controller 232, or an output signal from the recording signal processing section 210 and inputting the selected signal to the recording section 220.

The reproducing signal selection switch 132, the input path selection switch 231 and the recording signal selection switch 233 are operatively connected to each other so that they are operated in response to a recording mode control signal TRS which is generated upon the selection of a user.

In addition, the level displaying section 240 includes a first and a second envelope detectors 241 and 243 for, respectively, detecting an envelope of the output signal from the level controller 232 and an envelope of the output signal from a frequency modulator 205 which has passed through a variable resistor $VR_2$, a first and a second integrators 241 and 243 for, respectively, integrating output signals from the first and second envelope detectors 241 and 243, a comparator 245 for receiving and comparing output signals from the first and second integrators 242 and 244 through its non-inverting input terminal (+) and inverting input terminal (−), and a displayer 246 for flickering in response to an output signal from the comparator 245.

In the above construction, since the reproducing section 110, the reproducing signal processing section 120, the recording signal processing section 210 and the recording section 220 are conventional circuits, the detailed description therefor will be omitted hereinbelow for the simplicity. Moreover, the reproducing heads 111 and 112 are the same as the recording heads 222 and 223, but will be described separately and are shown in the drawing independently, for the explanation purposes.

The tape recording system for a video cassette tape recorder of the present invention operates as follows:

In general, the circuit configuration of a video cassette tape recorder for reproducing and recording a video tape comprises a reproducing unit 100 and a recording unit 220, as shown in the drawing. The reproducing unit 100 is adapted to detect a video signal from a video tape 310 and outputs the video signal to a video signal output terminal V-OUT after signal-processing the video signal for reproducing, while the recording unit 200 is adapted to record a video signal which is inputted through a video signal input terminal V-IN on a video tape 320 after signal-processing the video signal for recording.

In the tape recording system of the present invention, the reproducing unit 100 is provided with the reproducing signal switching section 130 and the recording unit 200 is provided with the recording signal switching section 130, so that a high-frequency reproducing signal which is outputted from the reproducing section 110 is outputted through the reproducing signal switching section 130 as a non-demodulated high-frequency reproducing signal. Also, the video signal which is inputted to the recording unit 200 is directly inputted to the recording section 220 through the recording signal switching section 230.

Here, since the reproducing signal selection switch 132 of the reproducing signal switching section 130, and the input path selection switch 231 and the recording signal selection switch 233 of the recording signal switching section 230 are connected to each other so that they are interlocked by a recording mode control signal TRS which is generated upon the selection of a user, when a user sets the switches 132, 231 and 233 so that their movable terminals a are connected to their fixed terminals c, a high-frequency reproducing signal is outputted from a reproducing video cassette tape recorder in a non-demodulated signal and at a recording video cassette tape recorder, the inputted high-frequency reproducing signal is directly inputted to the recording section 220.

The reproducing section 110 of the reproducing unit 100 amplifies the video signal through pre-amplifiers 113 and 114, which is detected by the reproducing video heads 111 and 112, and synthesizes the amplified video signal by a first adder 115 and then outputs a high-frequency reproducing signal.

The high-frequency reproducing signal which has been reproduced at the reproducing section 110 is inputted to a reproducing equalizer 121 and a low-pass filter 125 of the reproducing signal processing section 120 and also to the buffer 131 of the reproducing signal switching section 130. The reproducing luminance signal which has been outputted from the first adder 115 is compensated with its frequency characteristic by the reproducing equalizer 121 in accordance with the characteristic of the head, and demodulated into the original luminance signal through a luminance demodulator 122 and then filtered at the low-pass filter 123 so as to remove a noise therefrom. Thereafter, the reproducing luminance signal which is outputted from the low-pass filter 123 is inputted to a de-emphasis 125 so that a pre-emphasis characteristic which has been applied to the video signal at the recording operation is removed and then inputted to a second adder 128 as a compensated luminance signal.

Moreover, the reproducing signal which is outputted from the first adder 115 is filtered by the low-pass filter 125 of the reproducing signal processing section 120 so as to extract a color signal therefrom. The color signal is converted into the original frequency signal by a color converter 126, filtered at a band-pass filter 127 so as to remove a noise therefrom and then inputted to the second adder 128.

Accordingly, the luminance signal which has been outputted from the de-emphasis 124 and the color signal which has been outputted from the band-pass filter 127 are synthesized to each other by the second adder 128 and inputted as a reproducing video signal to a fixed terminal b of the reproducing signal selection switch 132 of the reproducing signal switching section 130.

Furthermore, the reproducing signal which is outputted from the first adder 115 of the reproducing section 110 is buffered by a buffer 131 of the reproducing signal switching section 130 and then inputted to a fixed terminal c of the reproducing signal selection switch 132.

At this moment, the reproducing signal selection switch 132 is switched by a switching control signal TRS which is generated by the selection of a user. Thus, the user may select either to output a reproducing video signal which has passed through the reproducing signal processing section 120, or to output directly a high-frequency reproducing signal which has passed through the buffer 131.

On the other hand, in the recording unit 200 of the recording video cassette tape recorder, the input path selection switch 231 of the recording signal switching section 230 is controlled by the switching control signal TRS, and a composite video signal which is imputted to the video signal input terminal V-IN is inputted either to an automatic gain controller 201 and the band-pass filter 211 of the recording signal processing section 210, or to a level controller 232 of the recording signal switching section 230, depending upon the switching of the input path selection switch 231.

The video signal which has been inputted to the recording signal processing section 210 is controlled with its gain into a predetermined level by the automatic gain controller 201 and filtered at the low-pass filter 202 so that only a luminance signal is detected. This luminance signal is emphasized with its high-band component at the pre-emphasis 203 and applied to a white/black clipper 204 so as to be clipped with its higher and lower levels which are over and less than a predetermined level. Consecutively, the luminance signal is modulated into a proper frequency signal suitable for recording by the frequency modulator 205 and applied to a variable resistor $VR_2$ of the first adder 215 and then inputted to an envelope detector 243 of the recording mode displaying section 240.

Moreover, the video signal which has been inputted to the band-pass filter 211 of the recording signal processing section 210 is filtered thereat so as to extract a color signal. The color signal is controlled with its gain into a predetermined level by an automatic color controller 212 and then inputted to a low-band converter 213. Thereafter, the color signal is filtered by the low-pass filter 224 and applied to a variable resistor $VR_3$ of the first adder 215.

Here, the variable resistors $VR_2$ and $VR_3$ of the first adder 215 are adapted to control the levels of the color signal and the luminance signal into compliance with the characteristics of the recording heads, and the resistance thereof are set in the manufacturing process of the video cassette tape recorder.

Thus, the luminance signal and the color signal are applied, respectively, to the variable resistors $VR_2$ and $VR_3$ of the first adder 215 and controlled into a proper level, thereafter composed into a composite video signal.

And, the video signal which has been amplified and level-controlled by the level controller 232 or the video signal which has been outputted from the first adder 215 is selected by the recording signal selection switch 233 and inputted to a recording amplified 221 of the recording section 220 so as to be amplified into a proper level suitable for recording, thereafter recorded on a video tape 320 through the recording heads 222 and 223.

In case that it is intended to record the video signal, which has been recorded on the video tape 320, on another tape, two video cassette tape recorders are provided in which the reproducing signal switching section 130 is contained in the reproducing unit 100 and the recording signal switching section 230 is contained in the recording unit 200. Thereafter, the video signal output terminal V-OUT of a reproducing video cassette tape recorder and the video signal input terminal V-IN of a recording video cassette tape recorder are connected to each other through a high-frequency cable by a user and then the switches 132, 231 and 233 are set so that their movable terminals a are connected to their fixed terminals c. Then, the reproducing VCR is operated in the reproducing mode in a state that a video tape 310 to be reproduced is loaded therein and the recording VCR is operated in the recording mode in a state that a video tape 320 to be recorded is loaded therein.

At this moment, since an output terminal of the buffer 131 and the video signal output terminal V-OUT are connected to each other by means of the reproducing signal selection switch 132 of the reproducing signal switching section 130, a high-frequency reproducing signal outputted from the reproducing section 110 is outputted through the video signal output terminal V-OUT, without being demodulated.

As a result, the high-frequency reproducing signal which is outputted from the reproducing unit 100 of the reproducing VCR is inputted to the video signal input terminal V-IN of the recording VCR through the high-frequency cable. At this moment, since the video signal input terminal V-IN and an input terminal of the level controller 232 are connected to each other by means of the input path selection switch 231 of the recording signal switching section 230 and an output terminal of the level controller 232 and an input terminal of the recording amplifier 221 of the recording section 220 are connected to each other by means of the recording signal selection switch 233, the high-frequency reproducing signal which has been inputted to the video signal input terminal V-IN is inputted to the recording section 220 through the input path selection switch 231, the level controller 232 and the recording signal selection switch 233 of the recording signal switching section 230.

Accordingly, the signal which is reproduced at the reproducing VCR is directly outputted through the video signal output terminal V-OUT without being demodulation-processed and inputted to the recording VCR. And, thus the high-frequency reproducing signal is directly inputted to the recording section 220 and then recorded on the video tape 320 in the recording VCR, without requiring a filtering and a frequency-modulation for converting the signal into a recording signal.

At this time, the recording current has to be changed in accordance with the characteristics of the head and circuitry of each video cassette tape recorder. For this purpose, the variable resistor VR₁ is provided to the level controller 232 of the recording signal switching section 230 and the level displaying section 240 is provided in order for a user to adjust the variable resistor VR₁.

The level displaying section 240 operates in a manner that the output signal from the level controller 232 and the output signal from the frequency modulator 205 are applied, respectively, to the first and second envelope detectors 241 and 243 and detected thereat as signals having direct current component and the detected signals are integrated through the first and second integrators 242 and 244 and compared by a comparator 245.

At this moment, even in case that the video signal input terminal V-IN and the level controller 232 are connected to each other by means of the input path selection switch 231, the frequency converter 205 of the recording signal processing section 210 outputs a reference frequency signal, unless the power is cutoff. Because, the frequency modulator 205 contains a reference frequency generator therein and the reference frequency from the reference frequency generator carries the output signal from the white/black clipper 204 so as to modulate the frequency of the luminance signal, the reference frequency signal which has been generated from the frequency modulator 205 itself is outputted in case that no output signal is outputted from the white/black clipper 204.

In other words, the luminance signal from the frequency modulator 205 is converted into a signal of low-frequency waveform carrying a direct current voltage by the second envelope detector 243, the converted luminance signal is integrated through the second integrator 244 into a direct current level and inputted to an inverting terminal (−) of the comparator 245. Morever, a high-frequency reproducing signal which has passed through the variable resistor VR₁ of the level controller 232 is detected at the first envelope detector 241 as a low-frequency waveform carrying a direct current voltage and integrated by the first integrator 242 and then inputted to a non-inverting terminal (+) of the comparator 245 as a direct current voltage level. Thus, the direct current voltage levels of two signals are compared by the comparator 245. At this moment, when the direct current voltage level of the first integrator 242 is higher than that of the second integrator 244, a high level signal is outputted from the comparator 245 so that the transistor Q₁ of the displaying section 246 is turned on and a light emitting diode LED₁ is lighted.

On the contrary, when the direct current voltage level of the first integrator 242 is lower than that of the second integrator 244, a low level signal is outputted from the comparator 245 so that the transistor Q₁ of the displaying section 246 and the light emitting diode LED₁ are turned off.

Accordingly, a user controls the variable resistor VR₁ of the level controller 232 so that the light emitting diode LED₁ of the level displaying section 240 is turned off, thereafter gradually controlling the variable resistor VR₁ until the light emitting diode LED₁ is lighted. That is, the variable resistor VR₁ is controlled so that the levels of the inverting terminal (−) and non-inverting terminal (+) of the comparator 245 are the same.

By controlling the variable resistor VR₁ of the level controller 232 as above, it is possible to comply the high-frequency reproducing signal which is inputted directly to the recording section 220 via the recording signal switching section 230 with a proper recording current suitable for the characteristic of the recording heads.

As described above in detail, the present invention provides the effects that in case of recording a reproducing signal from a video tape to another video tape, it is possible to record the high-frequency reproducing signal on a video tape by directly interfacing the reproducing signal without a demodulation process for the reproducing signal and a modulation process for the recording signal, thereby preventing any insertion of a noise which may be produced from such demodulation and modulation processing circuits and filters. Also, it is possible to enhance the signal/noise ratio, thereby obtaining a picture of good quality.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A tape recording system for a video cassette tape recorder, comprising:
   reproducing means for detecting video signals from a video tape;
   reproducing signal processing means for demodulating a first luminance signal and a first color signal from output signals from said reproducing means;
   reproducing signal switching means for selecting an output signal from the reproducing means or an output signal from the reproducing signal processing means and outputting the selected signal to a video signal output terminal being inputted to a video signal input terminal;
   recording signal processing means for processing a video signal inputted through the video signal input terminal by a second luminance signal and a second color signal;
   recording signal switching means for either switching the video signal being inputted to said video signal input terminal so that the video signal is outputted as a recording signal through said recording signal processing means, or controlling the inputted video signal into a recording current corresponding to a characteristic of recording heads so that the video signal is directly outputted as a recording signal;
   recording means for recording the recording signal which has been selected by said recording signal switching means on a video tape through the recording heads; and
   level displaying means for comparing the recording signal from the recording signal switching means and a reference frequency of the recording signal processing means.

2. The system as claimed in claim 1, wherein said reproducing signal switching means includes:
   a buffer for buffering a high frequency reproducing signal from the reproducing means; and
   a reproducing signal selection switch for selecting an output signal from said buffer or an output signal from the reproducing signal processing means and outputting the selected signal to the video signal output terminal.

3. The system as claimed in claim 2, wherein said recording signal switching section includes:
   a level controlling section for amplifying the inputted video signal and controlling the amplified video signal into an appropriate recording current suitable for the characteristic of the recording heads;

an input path selection switch for switching the video signal being inputted through the video signal input terminal to the recording signal processing means or to said level controlling section; and a recording signal selection switch for selecting an output signal from the level controlling means or an output signal from the recording signal processing means and inputting the selected signal to the recording means.

4. The system as claimed in claim 3, wherein the reproducing signal selection switch, the input path selection switch and the recording signal selection switch are operatively connected to each other so that they are operated in response to a recording mode control signal which is generated upon a selection of a user.

5. The system as claimed in claim 3, wherein said level displaying means includeds:

a first and a second envelope detectors for, respectively, detecting an envelope of the output signal from the level controlling section and an envelope of the reference frequency signal of a frequency modulator which has passed through a variable resistor;

a first and a second integrators for, respectively, integrating output signals from said first and second envelope detectors;

a comparator for receiving and comparing output signals from said integrators through inverting and non inverting input terminals, respectively; and a displaying section for comparing an output signal from the level controlling section and the reference frequency signal by the output signal from said comparator and displaying the comparing resultant.

* * * * *